(12) United States Patent
Cavarretta et al.

(10) Patent No.: US 10,294,605 B2
(45) Date of Patent: May 21, 2019

(54) HEAT PUMP LAUNDRY TREATMENT APPARATUS AND METHOD OF OPERATING A HEAT PUMP LAUNDRY TREATMENT APPARATUS

(71) Applicant: Electrolux Home Products Corporation N.V., Brussels (BE)

(72) Inventors: Francesco Cavarretta, Pordenone (IT); Roberto Ragogna, Malnisio (IT); Maura Pasquotti, Pordenone (IT); Stefano Zandona', Cordignano (IT); Elena Pesavento, Porcia (IT); Christian Montebello, San Giovanni Teatino (IT)

(73) Assignee: ELECTROLUX HOME PRODUCTS CORPORATION N.V., Brussels (BE)

( * ) Notice: Subject to any disclaimer, the term of this patent is extended or adjusted under 35 U.S.C. 154(b) by 525 days.

(21) Appl. No.: 14/443,163

(22) PCT Filed: Nov. 14, 2013

(86) PCT No.: PCT/EP2013/073778
§ 371 (c)(1),
(2) Date: May 15, 2015

(87) PCT Pub. No.: WO2014/076159
PCT Pub. Date: May 22, 2014

(65) Prior Publication Data
US 2015/0308034 A1    Oct. 29, 2015

(30) Foreign Application Priority Data
Nov. 16, 2012 (EP) ................... 12192940

(51) Int. Cl.
*D06F 58/20* (2006.01)
*D06F 58/28* (2006.01)

(52) U.S. Cl.
CPC .......... *D06F 58/206* (2013.01); *D06F 58/28* (2013.01); *D06F 2058/287* (2013.01);
(Continued)

(58) Field of Classification Search
CPC ............ D06F 58/206; D06F 58/28; D06F 2058/2854; D06F 2058/2864; D06F 2058/287; D06F 2058/2877
See application file for complete search history.

(56) References Cited

U.S. PATENT DOCUMENTS 3,702,030 A * 11/1972 Janke ................. D06B 1/00
                                                        34/498
3,909,955 A * 10/1975 Janke ................. D06F 58/28
                                                        307/138
(Continued)

FOREIGN PATENT DOCUMENTS

DE          4409607 A1    10/1994
DE     102005041145 A1    3/2007
(Continued)

OTHER PUBLICATIONS

International Search Report dated Dec. 9, 2013 in corresponding International Application No. PCT/EP2013/073778.
(Continued)

*Primary Examiner* — Ljiljana V. Ciric
(74) *Attorney, Agent, or Firm* — RatnerPrestia

(57) ABSTRACT

A heat pump laundry dryer or a heat pump washing machine having a drying function, includes a control unit controlling an operation of the laundry treatment apparatus. A laundry treatment chamber treats laundry using process air circulated in a process air circuit. A heat pump system has a refrigerant loop in which refrigerant fluid is circulated through a first and a second heat exchanger. A compressor circulates the refrigerant fluid through the refrigerant loop, and a cooling fan unit cools the compressor. During the operation, a conveyance capacity of the cooling fan unit is varied. A detector unit detects an operation parameter indicating a state of at least one electronic board. A method of operation includes operating the cooling fan unit based upon the
(Continued)

electronic board operation parameter, and controlling the compressor operation output based upon the electronic board operation parameter, wherein the compressor is a variable speed compressor.

13 Claims, 4 Drawing Sheets

(52) U.S. Cl.
CPC .............. *D06F 2058/2854* (2013.01); *D06F 2058/2864* (2013.01); *D06F 2058/2877* (2013.01)

(56) References Cited

U.S. PATENT DOCUMENTS

| | | | | |
|---|---|---|---|---|
| 5,448,141 | A * | 9/1995 | Kelley | H02P 6/085 318/400.01 |
| 5,564,831 | A * | 10/1996 | Bashark | D06F 37/304 34/493 |
| 6,745,495 | B1 * | 6/2004 | Riddle | D06F 58/28 34/493 |
| 7,216,514 | B2 * | 5/2007 | Sakita | D06F 39/005 134/56 D |
| 7,504,784 | B2 * | 3/2009 | Asada | D06F 37/304 318/400.02 |
| 7,665,225 | B2 * | 2/2010 | Goldberg | D06F 58/206 34/73 |
| 7,812,557 | B2 * | 10/2010 | Maekawa | D06F 37/304 318/400.02 |
| 7,926,202 | B2 * | 4/2011 | Dittmer | D06F 58/24 15/40 |
| 8,461,783 | B2 * | 6/2013 | Navarra | A47L 15/4225 318/8 |
| 8,536,810 | B2 * | 9/2013 | Yamada | H02P 27/04 318/400.09 |
| 9,356,542 | B2 * | 5/2016 | Ragogna | D06F 58/206 |
| 9,670,612 | B2 * | 6/2017 | Lee | D06F 58/206 |
| 2012/0017465 | A1 * | 1/2012 | Beers | D06F 58/206 34/493 |
| 2014/0298678 | A1 | 10/2014 | Tezcan et al. | |
| 2015/0069933 | A1 * | 3/2015 | Ragogna | D06F 58/206 318/105 |

FOREIGN PATENT DOCUMENTS

| | | |
|---|---|---|
| EP | 1884586 A2 | 2/2008 |
| EP | 2077350 A1 | 7/2009 |
| EP | 2212463 A1 | 8/2010 |
| EP | 2224052 A1 | 9/2010 |
| EP | 2333149 A1 | 6/2011 |
| EP | 2455526 A1 | 5/2012 |
| EP | 2460928 A1 | 6/2012 |
| WO | 2013050262 A1 | 4/2013 |

OTHER PUBLICATIONS

Extended European Search Report dated May 31, 2013 in corresponding European Application No. 12192940.0.
International Search Report dated Jan. 2, 2014 in related International Application No. PCT/EP2013/073512.
Extended European Search Report dated May 23, 2013 in related European Application No. 1292938.4.
Non-Final Office Action dated Oct. 2, 2017 in related U.S. Appl. No. 14/443,161.

* cited by examiner

HEAT PUMP LAUNDRY TREATMENT APPARATUS AND METHOD OF OPERATING A HEAT PUMP LAUNDRY TREATMENT APPARATUS

BACKGROUND

The invention relates to a heat pump laundry treatment apparatus, in particular a heat pump dryer or a heat pump washing machine having a dryer function, comprising a heat pump system and a cooling fan unit for cooling a compressor of the heat pump system. Furthermore, the invention relates to a method of operating such a heat pump laundry treatment apparatus.

EP 2 212 463 B1 discloses a heat pump laundry dryer comprising an open loop cooling channel for cooling the compressor of the heat pump system. The open loop cooling channel contains a blower to be activated and controlled by a control unit according to the signals of a temperature sensor. This temperature sensor is disposed adjacent to the condenser section of the heat pump system's refrigerant loop.

SUMMARY OF SELECTED INVENTIVE ASPECTS

It is an object of the invention to provide a heat pump laundry treatment apparatus and a method of operating a heat pump laundry treatment apparatus in such a manner that its heat pump system contributes to an economic drying performance.

According to an aspect of the invention, a heat pump laundry treatment apparatus comprises a control unit controlling the operation of the heat pump laundry treatment apparatus. The heat pump laundry treatment apparatus—in the following description denoted in brief "apparatus"—is in particular configured as a heat pump laundry dryer or a heat pump washing machine having a drying function.

Furthermore, the apparatus comprises a laundry treatment chamber for treating laundry using process air. The process air is circulated in a process air circuit arranged within the housing or cabinet of the apparatus. The apparatus also comprises a heat pump system having a refrigerant loop, in which the refrigerant fluid is circulated through a first heat exchanger and a second heat exchanger. A compressor circulates the refrigerant fluid through the refrigerant loop and a cooling fan unit is arranged for cooling the compressor. During the operation of the apparatus the conveyance capacity (which can also be denoted as cooling capacity) of the cooling fan unit is varied. Additionally, the apparatus comprises a detector unit for detecting an operation parameter indicating a state of an electronic board.

The control unit is adapted to control the operation of the apparatus, wherein the operation comprises at least one of the following method features a) and b):
a) operating the cooling fan unit in dependency of the electronic board operation parameter,
b) controlling the compressor operation output in dependency of the electronic board operation parameter, wherein the compressor is a compressor with variable speed.

Since the electronic board operation parameter—denotable in brief "operation parameter"—is representing a state of an electronic board it is possible to consider such state in operating the cooling fan unit. Thus, predefined safety conditions can be easily considered for operating the cooling fan unit even if specific thermodynamic conditions (e.g. refrigerant and air temperature levels) are not yet detected for triggering the cooling fan unit. Furthermore, considering said operation parameter supports the compressor in keeping a constant performance level and subsequently stable refrigerant temperature of the refrigerant fluid.

The above mentioned method feature a) is applicable on compressor types with fixed operation speed and on compressor types with variable operation speed. Method feature b) is only applicable for a compressor having a variable speed. For example the operation or driving speed of the compressor is preferably between 1800 rpm (rounds per minute) and 7000 rpm.

Preferably, the operation control of the cooling fan unit according to the claimed method is prioritized in comparison to its general or basic control by the control unit. Thus, a minimum cooling fan activation (and consequently a minimum conveyance capacity) can be ensured dependent on at least one electronic board operation parameter independent from specific apparatus and/or ambient conditions and even when cooling the compressor is not intended or not required according to some specific operation modes of the apparatus.

Preferably, there is arranged at least one air inlet and at least one air outlet within the apparatus cabinet. Thus, the cooling fan unit is able to convey air from said air inlet(s) through the apparatus cabinet over the compressor to be cooled and through said outlet(s) out of the apparatus cabinet. This conveyance can be achieved e.g. by sucking in at least a portion of the conveyed cooling air through said air inlet(s) and by exhausting at least a portion of the conveyed cooling air through said air outlet(s).

In particular, the air conveyance occurs within the cabinet without any specific air channel such that the conveyed cooling air can at least partially freely circulate within the cabinet. Thus, air circulation removes heat and/or humidity from the cabinet and prevents potential overheating of electronic boards and/or other electronic parts like a control unit. Furthermore, potential condensate on the electronic board and/or its potential malfunction due to humidity is prevented.

In an embodiment, the cooling fan unit comprises at least one blower and at least one motor for driving the blower. Thus, the cooling fan unit can be configured cost-saving by standard parts.

Regarding the refrigerant fluid, this can be provided as a refrigerant gas or a refrigerant fluid at standard conditions (room temperature/atmospheric pressure).

Preferably, the operation parameter is indicative of at least of the following parameters:
 a temperature of the electronic board,
 a motor temperature detected via the electronic board,
 a current delivered by the electronic board to a motor exceeding a threshold value or exceeding a threshold averaged value.

In this regard, it is noted that the operation parameter is not the temperature of the refrigerant or any temperature related to the refrigerant temperature like a temperature of a refrigerant's loop part (e.g. condenser, evaporator, compressor).

In an embodiment, a temperature sensor is part of the detector unit. Thus, a temperature of the electronic board can detected which represents the operation parameter. Supporting safe operating conditions of the electronic board, a logic comparison can be made between this detected operation parameter and a defined temperature threshold of the electronic board. The cooling fan unit can be activated if said temperature threshold is exceeded.

In a preferred embodiment, there exist at least two electronic boards each comprising a temperature sensor for detecting a board temperature as an electronic board temperature representing an operation parameter. Considering electronic board temperatures of several electronic boards, the cooling fan unit can be activated if a defined first temperature threshold of a first electronic board is exceeded or if a defined temperature threshold of another electronic board is exceeded. This activation can be made in dependency of a predefined priority of each electronic board, i.e. relating to the specific cooling necessity of each electronic board. Thus, an electronic board having higher need for cooling can be prioritized supporting safe operating conditions of the apparatus.

As already mentioned the operation of the cooling fan unit is controlled. Preferably, this control is or includes adapting the conveyance capacity of the cooling fan unit in dependency of the electronic board operation parameter. In an embodiment the conveyance capacity of the cooling fan unit is 'increased' or changed in response to the electronic board operation parameter just by switching the blower of the cooling fan unit to operation (ON). Alternatively or additionally, the conveyance capacity of the cooling fan unit is defined by or can be adapted by adapting a duty cycle ratio of switching the cooling fan unit ON and OFF, and/or the conveyance rate of the cooling fan unit.

The duty cycle ratio can be represented e.g. by the ratio of two sums, wherein one sum is the sum of the total ON-times (i.e. activation of the cooling fan unit) and the other sum is the sum of the total OFF-times (i.e. cooling fan unit is switched OFF) within a predefined time period. In this connection, it is not necessary to calculate the sum of OFF-times separately. Rather, the sum of OFF-times can be automatically determined by the sum of ON-times and the predefined time period.

The conveyance rate is preferably determined by the flow rate of the blowing cooling air generated by the cooling fan unit. In an embodiment, the conveyance capacity or the conveyance rate is modified (i.e. particularly increased) by a fan speed or a motor speed of the cooling fan unit.

Switching On/Off the conveyance capacity or adjusting the conveyance capacity of the cooling fan unit can be monitored by a flow meter that is arranged in the flow path of the cooling air conveyed by the blower. Thereby it can be checked whether the intended air flow corresponds to the actual air flow and conveyance capacity adjustment can be provided by the control unit. A deviation of flow rate may happen, if the user (partially) blocks a cooling air inlet or outlet for example.

In an embodiment, the varying the conveyance capacity of the cooling fan unit occurs in such a manner that the increase of the conveyance rate of the cooling fan unit is the higher the more a board parameter exceeds a defined threshold value (e.g. temperature threshold). Particularly, a difference between a detected electronic board temperature and a temperature threshold is calculated and the higher the calculated difference the more the conveyance capacity is increased. This increase is configured e.g. as an increase of the fan speed of the cooling fan unit and/or the already mentioned duty cycle ratio (between ON-times and OFF-times).

The electronic board is configured dependent on the desired technical application. In an embodiment, the electronic board is able to execute several technical functions. Preferably, the electronic board is configured to execute at least one of the following technical functions:

supplying controlled power to a drum motor for rotating a drum being the laundry treatment chamber, supplying controlled power to a process air fan motor for circulating the process air in the process air circuit, supplying controlled power to the compressor for operating the compressor.

Particularly, the drum motor and the process air fan motor are configured in a space-saving manner as one sole motor. The drum motor and/or the process air fan motor can be designed as a fixed speed motor or as a variable speed motor.

Using only one electronic board for executing several technical functions facilitates mounting and space-saving arrangement of the parts in the apparatus cabinet. In a further embodiment, several technical functions are executed each by a separate electronic board.

In a further embodiment, the electronic board is or comprises an inverter electronic supplying controlled current to the dedicated motor (e.g. drum motor or compressor motor). By using an inverter electronic, rotational speed of the drum or process air fan or the compressor can be easily varied.

The detected electronic board operation parameter is advantageously used for ensuring a sufficient (minimum) cooling of an inverter electronic even when cooling of the driven part (e.g. compressor) is not intended or not required according to some specific operation modes of the apparatus. For example, cooling of the compressor's inverter electronic occurs usually automatically by the cooling flow of the cooling fan unit which is generated for cooling the compressor according to the specific cooling requests in several operation modes. However, in some operation modes it is not necessary to cool the compressor (e.g. in a warm-up phase of the heat pump system) and consequently also the inverter electronic is not cooled. However, a cooling of the inverter electronic could be desired even if the compressor is not cooled. To realize such a desired cooling of inverter electronic, the cooling fan unit is activated preferably in dependency of a state (e.g. temperature) of the inverter electronic.

In order to support prevention of potential condensate on the electronic board and/or its potential malfunction due to humidity or prevention of potential overheating of the electronic board in a technical simple manner the cooling fan unit for cooling the compressor is configured in preferred embodiments to blow at least a portion of the conveyed air flow into the apparatus cabinet towards the electronic board, and/or to suck at least a portion of the conveyed air flow through the apparatus cabinet over the electronic board.

Preferably, the method further comprises additionally varying the conveyance capacity of the cooling fan unit depending on one or more input variables and at least one environment parameter of the apparatus environment. In this regard, the method occurs in dependency of at least one electronic board operation parameter as a kind of main controlling the cooling fan unit and/or the compressor operation output. The at least one electronic board operation parameter is prioritized over other parameters (e.g. the said input variables, environment parameter), i.e. other operation parameters support a kind of secondary control.

The input variables are particularly represented by one or more of the following:

a previous operation time of the apparatus, and/or a user selectable input variable, and/or a working parameter of the laundry drum, and/or a working parameter of a process air fan, and/or a working parameter of an electric driving motor, and/or a working parameter of the heat pump system, and/or a working parameter of the compressor, and/or a drying progress status parameter and/or a status parameter of the laundry to be dried, and/or a machine alarm status parameter.

A previous operation time of the apparatus is a useful input variable since a long operation time causes increasing waste heat from the components within the apparatus cabinet and consequently the conveyance capacity value can be adapted reasonably to the expected waste heat volume.

A user selectable input variable means a variable selected by the user of the apparatus. This variable is preferably dependent on at least one of the following features: a selected cycle or program, a selected cycle option (ECO, NHGT, FAST), final humidity, laundry amount, laundry type.

The working parameter of the laundry drum is preferably represented by the motor power and/or motor speed of the drum motor.

The working parameter of the process air fan is constituted particularly by a fan speed and/or fan flow rate.

The working parameter of the electric driving motor is e.g. the machine power supply (particularly voltage and/or current) and/or a motor speed.

The electric driving motor itself is represented e.g. by a laundry drum motor, a blower motor and/or a compressor motor.

The working parameter of the heat pump system is preferably a detected temperature of the refrigerant.

The working parameter of the compressor is constituted e.g. by its compressor power, a compressor speed and/or a status of the compressor motor.

Another input variable is represented by the power supply (particularly voltage and/or current) supplied to the apparatus.

The machine alarm status parameter is represented e.g. by an overheat alarm, an electric failure alarm etc.

Preferably, the electronic board for controlling the compressor is arranged in proximity of or close to the compressor or the cooling fan unit. Particularly, the electronic board is arranged in proximity of both parts, the compressor and the cooling fan unit, thus supporting a space-saving arrangement of the parts within the apparatus cabinet. In a preferred embodiment, the proximity is configured as a distance with a range extending from 10 cm to 20 cm.

Especially, the electronic board is not arranged in a top region of the apparatus cabinet but it is arranged in a bottom region of the apparatus cabinet. This facilitates a close a proximate arrangement of the electronic board and the compressor and/or cooling fan unit which are arranged in many applications in the base section of the apparatus cabinet, too.

In an embodiment, the compressor is a variable speed compressor and the electronic board operation parameter is the temperature detected on or at the electronic board. Preferably, the output of the compressor, i.e. the compressor speed and/or power, is reduced in response to an electronic board temperature increase. In particular the control unit decreases or starts to decrease the compressor output, when the temperature of the electronic board exceeds a predefined temperature threshold. By reducing the compressor output, the refrigerant temperature is decreasing which in turn decreases the temperature in the interior of the apparatus housing which in turn reduces the electronic board temperature. In case the electronic board is the board supplying the compressor with power (e.g. an inverter), a reduction in the power supplied to the compressor reduces the heat deposited in the electronic board and thus its temperature.

In a preferred embodiment the motor output or compressor output of the variable speed compressor is increased when the cooling fan unit is operated in dependency of the electronic board operation parameter. Due to this relationship of operation it is possible to compensate potential performance loss of the compressor (and subsequently also of the heat pump system) because of its increased cooling by the operated cooling fan unit. Said increased cooling is technical easily compensated by increasing the compressor output of the variable speed compressor thus supplying a higher amount of electrical energy to the compressor which is transformed to heat flowing into the heat pump system.

In an embodiment, the explained compensation is executed in such a manner that the additional electrical energy provided to increase the compressor output just compensates or essentially compensates the heat dissipated from the compressor by the cooling fan unit when this cooling fan unit is operated in dependency of the electronic board operation parameter. This kind of compensation supports additionally operating of the compressor and the heat pump system without performance loss.

Preferably, the cooling fan unit is operated to reach a minimum conveyance capacity value (according to a prioritized control) even if the heat pump system does not require compressor cooling (according to a normal or standard operation control). This operation ensures a minimum amount for cooling the electronic board even if the compressor does not need cooling according to the standard operation control. Such operation is given e.g. in a low energy operation mode using e.g. a variable speed compressor operated at low compressor output. Even if the temperature of the heat pump system's refrigerant has not reached its optimized operation temperature (so called "steady state") the cooling fan unit is operated to cool the compressor (although not necessary) and thereby to cool the electronic board.

In an embodiment, if the electronic board parameter exceeds a predefined threshold, the activation or increase of the cooling capacity of the cooling fan unit is delayed and instead the output of the compressor, i.e. the compressor speed and/or power, is reduced. Reduction of the compressor output can be made in one step, in a continuous way (e.g. compressor output is reduced with increasing electronic board temperature or is reduced in iterative incremental steps). By this delay, an "active" cooling by switching on the cooling fan unit is not necessary. Rather, the cooling fan unit can be kept in its deactivated state or changed into its deactivated state. In many applications, this is an energy-saving alternative operation of the variable speed compressor and the cooling fan unit (if in an activated state before this operation) to achieve sufficient cooling of the electronic board. Only if the 'cooling' by reducing the compressor output cannot lower or compensate an increase in the monitored electronic board parameter, the cooling capacity of the cooling fan unit is increased.

The above described and the below described method and apparatus features can be combined in any arbitrary combination.

BRIEF DESCRIPTION OF THE DRAWINGS

Reference is made in detail to preferred embodiments of the invention, examples of which are illustrated in the accompanying figures which show.

DETAILED DESCRIPTION OF EXAMPLE EMBODIMENTS

Figure 1:
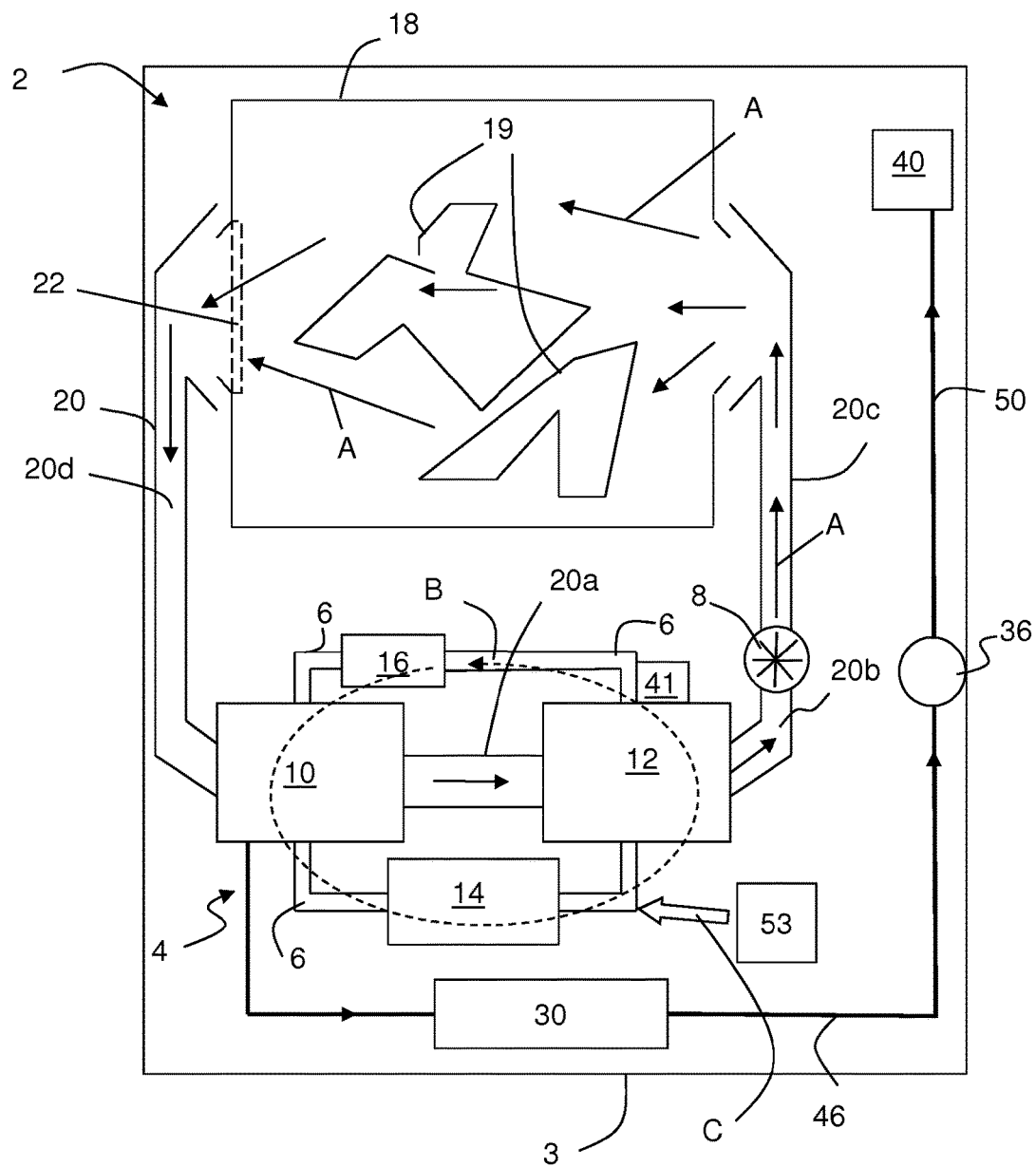
FIG. 1 a schematic view of a laundry treatment apparatus.

FIG. 1 shows a schematically depicted laundry treatment apparatus 2 which in this embodiment is a heat pump tumble dryer. The tumble dryer 2 comprises a heat pump system 4, including a closed refrigerant loop 6 which comprises in the following order of refrigerant flow B: a first heat exchanger 10 acting as evaporator for evaporating the refrigerant and cooling process air, a compressor 14, a second heat exchanger 12 acting as condenser for cooling the refrigerant and heating the process air, and an expansion device 16 from where the refrigerant is returned to the first heat exchanger 10. Together with the refrigerant pipes connecting the components of the heat pump system 4 in series, the heat pump system forms the refrigerant loop 6 through which the refrigerant is circulated by the compressor 14 as indicated by arrow B.

The process air flow within the treatment apparatus 2 is guided through a compartment 18 of the home appliance 2, i.e. through a compartment for receiving articles to be treated, e.g. a drum 18. The articles to be treated are textiles, laundry 19, clothes, shoes or the like. The process air flow is indicated by arrows A in FIG. 1 and is driven by a process air blower 8. The process air channel 20 guides the process air flow A outside the drum 18 and includes different sections, including the section forming the battery channel 20a in which the first and second heat exchangers 10, 12 are arranged. The process air exiting the second heat exchanger 12 flows into a rear channel 20b in which the process air blower 8 is arranged. The air conveyed by blower 8 is guided upward in a rising channel 20c to the backside of the drum 18. The air exiting the drum 18 through the drum outlet (which is the loading opening of the drum) is filtered by a fluff filter 22 arranged close to the drum outlet in or at the channel 20. The optional fluff filter 22 is arranged in a front channel 20d forming another section of channel 20 which is arranged behind and adjacent the front cover of the dryer 2. The condensate formed at the first heat exchanger 10 is collected and guided to the condensate collector 30.

The condensate collector 30 is connected via a drain pipe 46, a drain pump 36 and a drawer pipe 50 to an extractable condensate drawer 40. I.e. the collected condensate can be pumped from the collector 30 to the drawer 40 which is arranged at an upper portion of the apparatus 2 from where it can be comfortably withdrawn and emptied by a user.

Figure 2:
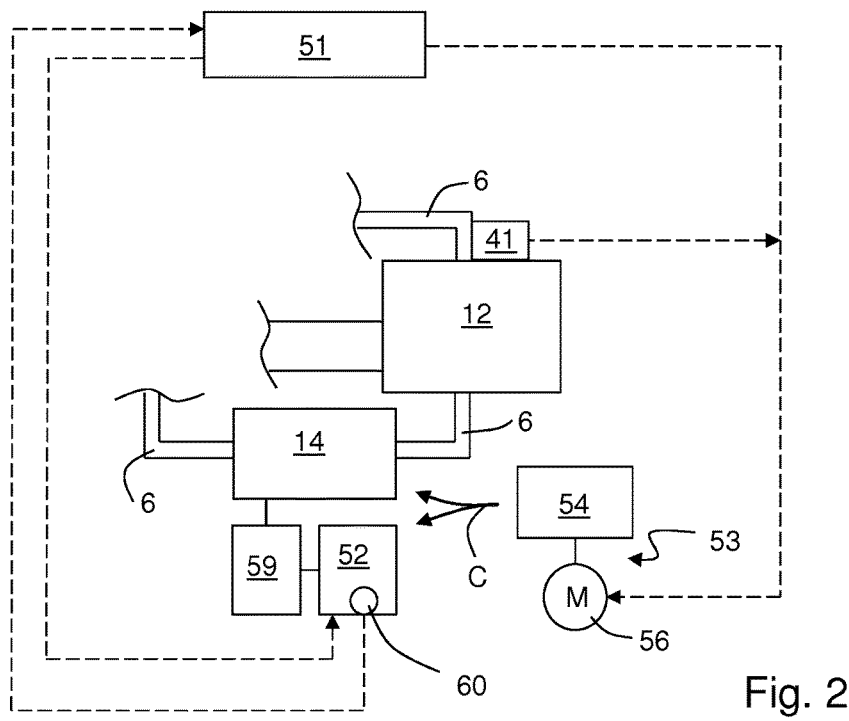
FIG. 2 a block diagram for the control of essential parts of the laundry treatment apparatus, FIG. 3 a flow diagram showing a control flow implemented by the control unit for cooling the compressor and the electronic board, and FIG. 4a-c temperature over time diagrams illustrating different operation and control conditions.

According to FIG. 2 a control unit 51 is disposed in the cabinet of the apparatus 2 to control several parts in order to achieve efficient cooling of the compressor 14 and/or its electronic board (i.e. an inverter board 52) containing amongst others an electronic inverter. In one embodiment this control unit 51 also controls the above mentioned drain pump 36.

The control unit 51 controls a cooling fan unit 53. This cooling fan unit 53 comprises a blower 54 and a motor 56 for activating the blower 54. The cooling fan unit 53 is arranged for cooling the compressor 14 and for cooling its inverter board 52, particularly the mentioned electronic inverter as part of the inverter board 52. Usually, cooling the inverter board 52, particularly of its inverter, occurs automatically by the cooling air flow C which is generated for cooling the compressor 14 according to the specific cooling requests in several operation modes. However, in some operation modes it is not necessary to cool the compressor 14 and consequently also the inverter board 52 and particularly its inverter are not cooled. However, a cooling of the inverter board 52 could be desired even if the compressor 14 is not cooled. For implementing under the control of the control unit 51 such a desired cooling of the inverter board 52, the control unit 51 is able to control accordingly the cooling fan unit 53 and/or a compressor motor 59 which interacts with the inverter board 52 and is driving the compressor 14.

The cooling air C conveyed by the cooling air blower 54 is entering the cabinet or housing 3 of the dryer 2 through one or more ambient air inlet openings (not shown). For example a cooling air inlet is provided at the lower bottom region at the base section of the housing 3. One or more outlet openings (not shown) for discharging cooling air are provided at the dryer housing 3, for example at the bottom of base section 5 and/or at an upper region of the rear cover forming part of housing 3. The blower 54 directs the cooling air flow C mainly towards the compressor 14, however a portion of the air flow and/or the air flow that has passed the compressor circulates within the dryer housing 3 where it induces an air exchange of internal air with ambient air sucked in by the blower. A portion of this air exchange cooling cools electronic boards (like the electronic board of the control unit, the power board for the drum and/or process air blower, and/or the inverter for powering the compressor motor). In the embodiment of the variable speed compressor, the inverter 52 for powering the variable compressor output is arranged close to the compressor covering shield and therefore is in the flow path of the cooling air C flown to the compressor.

Preferably the control unit 51 is at the same time the control unit for controlling and monitoring the overall operation of the apparatus 2. For example and as shown in FIG. 2, the control unit 51 receives a temperature signal from a temperature sensor 41 which is arranged at the outlet of the second heat exchanger 12 (condenser) and which is indicative of the refrigerant temperature T_refrig at that position.

In normal operation the cooling fan unit 51 is operated or activated by the control unit 51 in response to the temperature signal T_refrig received from the temperature sensor 41. When the cooling fan unit 51 is activated, which means that cooling air C is blown by the blower 54 towards the compressor 14 and is thus circulated also in the cabinet of the apparatus 2, the status of the fan unit 53 is set to "FAN ON". The control procedure implemented by the control unit 51 and dependent on the detected electronic board operation parameter (e.g. the below mentioned inverter temperature T_inv of the inverter board 52) is able to activate the fan unit 53 in (extended) periods in which the fan unit 53 is not activated or is not sufficiently enough activated alone due to cooling needs indicated by the temperature from sensor 41. This additional cooling can be named 'prioritized cooling' being prioritized over the cooling requirement of the compressor (via sensor 41 signal). This additional cooling ensures a minimum conveyance capacity value of the cooling fan unit even if the heat pump system 4 does not require cooling of the compressor 14.

On the other hand, if the signal from temperature sensor 41 indicates cooling need for the compressor 14 (which may depend additionally on other parameters than the temperature signal alone), the activation of fan unit 53 is preferably prioritized over the activation by the requirement for cooling the other components in the apparatus cabinet (e.g. the inverter board 52). Thus a minimum cooling is guaranteed, whether the compressor 14 or the other components need to be cooled by the blower activation.

Alternatively, the control procedure implemented by the control unit 51 executes a 'prioritized control' of the cooling fan unit 53 such that dependent on the detected value of an electronic board operation parameter (e.g. the inverter temperature T_inv) and on the existence of a compressor 14 having variable operation speed the cooling fan unit 53 can be deactivated (state "FAN OFF") and simultaneously the compressor operation output, i.e. the compressor speed and/or power is reduced as described below.

It is noted that a board temperature sensor 60 is disposed at the inverter board 52 to indicate the temperature state T_inv of the inverter board 52. The control unit 51 compares the signals of this board temperature sensor 60 with a defined threshold value T_inv_set. The board temperature sensor 60 can be arranged in a suitable position at or in or on a casing of the inverter board 52.

The functioning of control unit 51 for cooling the compressor 14 and/or the inverter board 52 will be explained by the flow diagram according to FIG. 3. The drying cycle is starting (step S1) under a basic control mode. In this regard, the blower 54 is not activated, i.e. the status of the blower 54 is "FAN OFF" and the drying cycle starts (S1a) at an operation output OUT_comp of the compressor 14 which is equal to a defined standard output value OUT_std in case of a variable speed compressor type or starts alternatively at a fixed operation output in case of a fixed speed compressor type. The compressor output may be the compressor speed and/or power.

The first condition to be verified is the end of the drying cycle (step S2). This verification is preferably made by considering a laundry humidity level, time elapsed from apparatus start, and/or an appropriate algorithm. If the end of the drying cycle is not detected a comparison is made between the refrigerant temperature T_refrig detected by the temperature sensor 41 and a defined setpoint refrigerant temperature T_refrig_set (step S3). If the detected refrigerant temperature T_refrig is higher than the setpoint refrigerant temperature T_refrig_set, the blower 54 is activated (status "FAN ON") and the compressor 14 is driven furthermore at the standard output value OUT_std (in case of variable speed compressor) or at the fixed output value (in case of fixed speed compressor).

If the detected refrigerant temperature T_refrig is not higher than the setpoint refrigerant temperature T_refrig_set, the inverter temperature T_inv of the inverter board 52 is compared with a defined setpoint inverter temperature T_inv_set (step S4). If the detected inverter temperature T_inv is not higher than the setpoint inverter temperature T_inv_set, the blower 54 will be deactivated or remains deactivated (status "FAN OFF"). However, if the detected inverter temperature T_inv is higher than the setpoint inverter temperature T_inv_set, the cooling fan unit 53 will be controlled depending on the used type of compressor 14 (with fixed operation speed or variable operation speed). If the compressor 14 has a fixed/constant operation speed, the cooling fan unit 53 will be activated into its state "FAN ON" (step S7). This alternative control is symbolized by a dashed line between step S4 and step S7. If the compressor 14 has a variable operation speed, the compressor output value OUT_comp is verified (step S5).

If at step S5 the actual compressor operation output OUT_comp is not higher than a defined lower limit output value OUT_lo_lim (i.e. the compressor output is operated at its lowest allowable operational output OUT_lo_lim), the blower 54 will be activated (status "FAN ON" in step S7) and the compressor output is increased from OUT_lo_lim to the standard output value OUT_std (step S1a). However, if the actual compressor output value OUT_comp is higher than the defined lower limit output value OUT_lo_lim, the status of the blower 54 is verified (step S6). If applicable, the status of the blower 54 is operated into "FAN OFF", i.e. the blower 54 will be deactivated. Additionally, the control unit 51 reduced the compressor operation output OUT_comp (which is the currently applied output current OUT_comp) by a predefined output increment value ΔOUT what can be expressed as new OUT_comp=current OUT_comp−ΔOUT in step S8.

For ensuring the lifetime of the variable speed compressor 14 and/or the stability of proper operation of the heat pump system 4, the compressor can not be (permanently) operated below the predefined minimum value OUT_lo_lim. Consequently in step S8 the compressor output is set to OUT_lo_lim, if the increment reduction would result in a lower value.

As mentioned above, steps S5, S6 and S8 are for variable speed compressors only. Summarizing this control branch, if the electronic board temperature T_inv is above the threshold T_inv_set, it is first checked, whether the compressor already operates at the lowest output limit OUT_lo_lim. If the output is higher than OUT_lo_lim, the output is (further) reduced and the blower is (maintained) switched OFF (FAN OFF) which has a cooling effect as less power is flowing through the inverter 52 and/or the power of the heat pump system is lowering (thus lowering the internal temperature within the dryer housing 2). If however the compressor is already at its lowest allowable operation output OUT_lo_lim (S5), for cooling of the electronic board 52 the blower 54 is activated (S7). The effect of reducing the compressor output preferably over starting the blower is that energy consumption can be reduced (no exhaust of heat via the blower) and the cooling effect of the blower for cooling the electronic board which also cools the refrigerant (compare FIG. 4b) is avoided as far as possible.

Figure 4A:
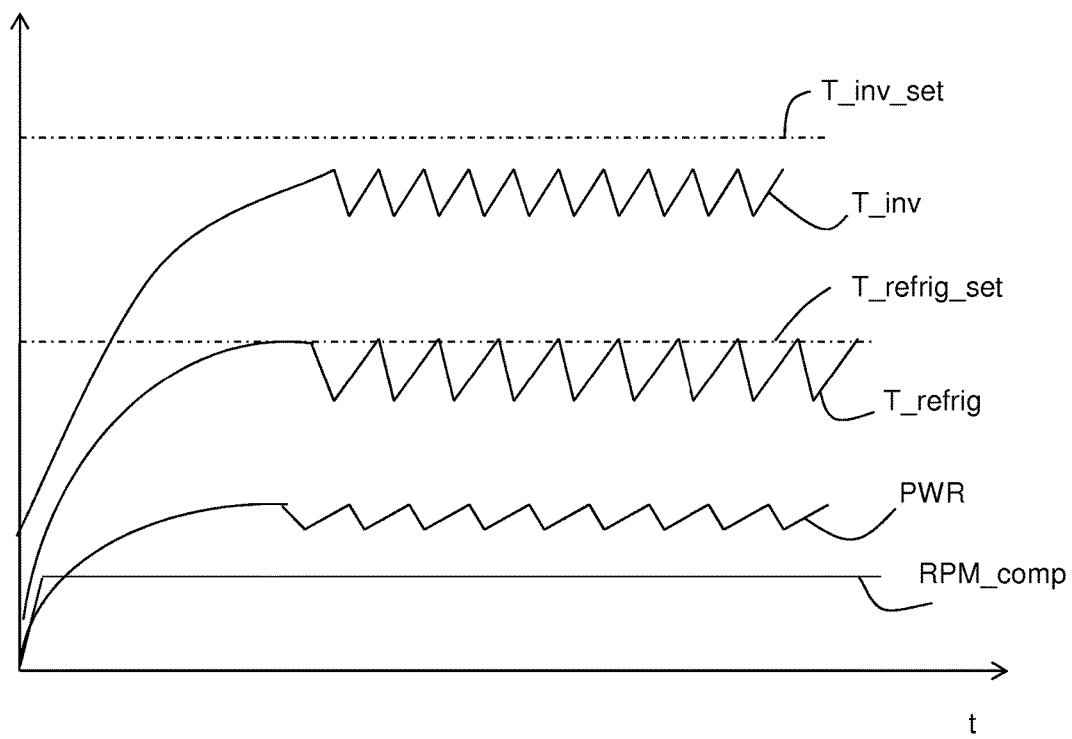
Figure 4B:
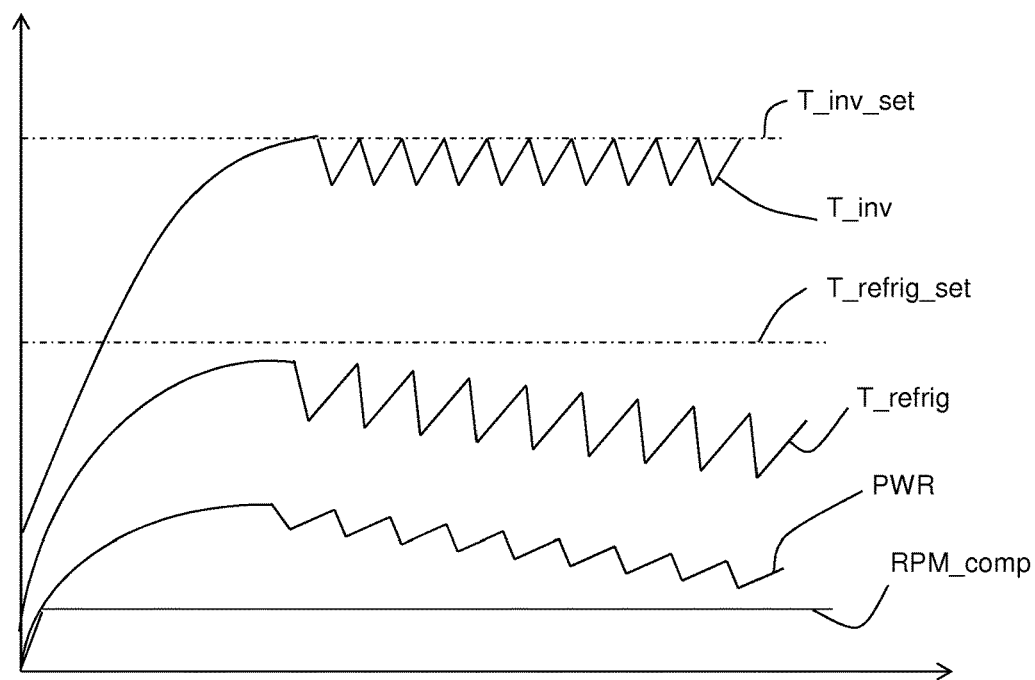
Figure 4C:
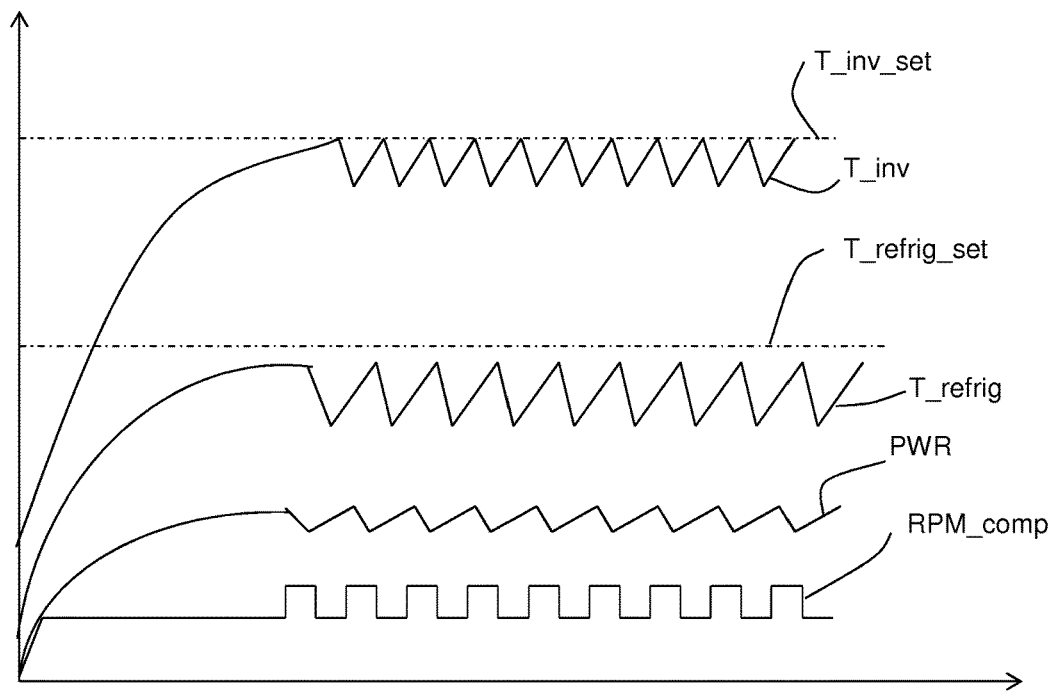

FIG. 4a shows an example case for controlling the operation of the dryer when the activation of the cooling fan unit 53 by the control unit 51 is made only in response of the temperature detected with the temperature sensor 41 for detecting the refrigerant temperature. The diagram in FIG. 4a (and the diagram of FIGS. 4b and 4c) shows over time t and in relative scale the electronic board temperature T_inv (inverter temperature), the refrigerant temperature T_refrig, the compressor power PWR and the compressor rotational speed RPM_comp. Further the above mentioned temperature levels of the setpoint refrigerant temperature T_refrig_set and the setpoint inverter temperature T_inv_set are indicated. FIGS. 4a to 4c do not show an exact alignment and scaling of the curves relative to each other. Generally it is to be understood that with switching ON of the blower 54 the refrigerant and electronic board temperatures and the compressor power decrease (possibly with some time delay); and conversely by switching OFF the blower 54 the refrigerant and electronic board temperatures and the compressor power increase (possibly with some time delay).

In the case of FIG. 4a, the electronic board temperature T_inv does not reach the setpoint inverter temperature T_inv_set. The blower 54 is activated to provide the cooling air C to the compressor 14 due to the refrigerant temperature T_refrig reaching the setpoint refrigerant temperature T_refrig_set. After activating the blower 54, the compressor is cooled and the refrigerant temperature T_refrig falls to a lower temperature threshold, where the control unit 51 switches off the cooling fan unit 53. With the blower 54 off, the refrigerant temperature T_refrig rises again until it again reaches the setpoint refrigerant temperature T_refrig_set, the limit where the blower 54 is switched on again.

In FIG. 4*a* the rotational speed RPM_comp of the compressor is increased after starting the compressor at the beginning of a drying cycle to a constant value under such control conditions (electronic board temperature T_inv does not reach setpoint inverter temperature T_inv_set). Due to the constant rotational speed RPM_comp of the compressor, the compressor power PWR varies with the temperature of refrigerant (higher refrigerant temperature at the outlet of the condenser 12 also means higher pressure of the refrigerant at the outlet of the compressor and thus higher energy consumption by the compressor motor 59).

FIG. 4*b* shows a situation where the electronic board temperature T_inv reaches the predefined setpoint inverter temperature T_inv_set repeatedly, while the refrigerant temperature T_refrig does not reach its assigned predefined setpoint refrigerant temperature T_refrig_set. Activation and deactivation of the cooling fan unit 53 is provided by the control unit 51 exclusively due to the time dependency of the electronic board temperature T_inv which is here higher than in the case of FIG. 4*a*. For example in the situation of FIG. 4*b* the ambient temperature (thus the temperature of cooling flow C) is higher than in the case of FIG. 4*a* and the electronic board 52 (detected via sensor 60) heats up more rapidly.

As in FIG. 4*a*, in FIG. 4*b* the rotational speed RPM_comp of the compressor is increased to a constant value which is maintained over time. For implementing the control methods in the situations of FIGS. 4*a* and 4*b* a constant speed compressor may be used. After activation at limit setpoint inverter temperature T_inv_set, the blower 54 is switched OFF when the electronic board temperature T_inv falls below a predefined value. By the cooling of the compressor via the blower, the refrigerant temperature T_refrig also decreases. When the blower is switched OFF, the temperatures of the electronic board and the refrigerant rise again until—in this example—the electronic board temperature T_inv reaches again the setpoint inverter temperature T_inv_set. In the specific situation shown, the cooling effect for the refrigerant is higher than for the electronic board temperature T_inv such that due to repeated activation/deactivation of the cooling fan unit 53, the refrigerant temperature T_refrig falls over time. As mentioned above, the power consumption (compressor power PWR) varies with the refrigerant temperature T_refrig.

FIG. 4*c* provides a control method which compensates the decline of the refrigerant temperature T_refrig over time when the blower is activated due to the electronic board temperature T_inv as shown in FIG. 4*b* and which can be implemented when using a variable-speed compressor. In FIG. 4*c*, the compressor speed is the controlled compressor output. In FIG. 4*c* again the blower 54 is switched ON and OFF by the control unit due to the electronic board temperature T_inv reaching the threshold setpoint inverter temperature T_inv_set or reaching a lower temperature limit thereafter, respectively. At the same time points at which the blower is switched ON, the rotational speed RPM_comp of the compressor is increased from the standard speed value RPM_std (as an example) to a higher compressor speed value as shown by the step-like increase. At the time points when the control unit switches OFF the blower, the compressor speed is decreased again from the higher speed value to the standard speed value in a step-like decrease.

By increasing the compressor speed during the time periods in which the blower is activated, the 'over-cooling' of the refrigerant can be compensated (remember: here the blower was not activated for cooling the refrigerant/compressor, but for cooling the electronic board). As shown, the increased speed can be selected such as to nearly compensate the cooling effect of blower activation in the average over time (the temporal and repeated cooling by the blower activity is still observed). Thereby the drying efficiency of the dryer is maintained and the drying duration is not extended by the cooling activity for cooling the electronic board. Thus FIG. 4*c* gives an example how the operation of the dryer is controlled in dependency of the electronic board parameter (temperature) where at the same time the blower activity is adapted and the compressor operational speed is adapted.

Figure 3:
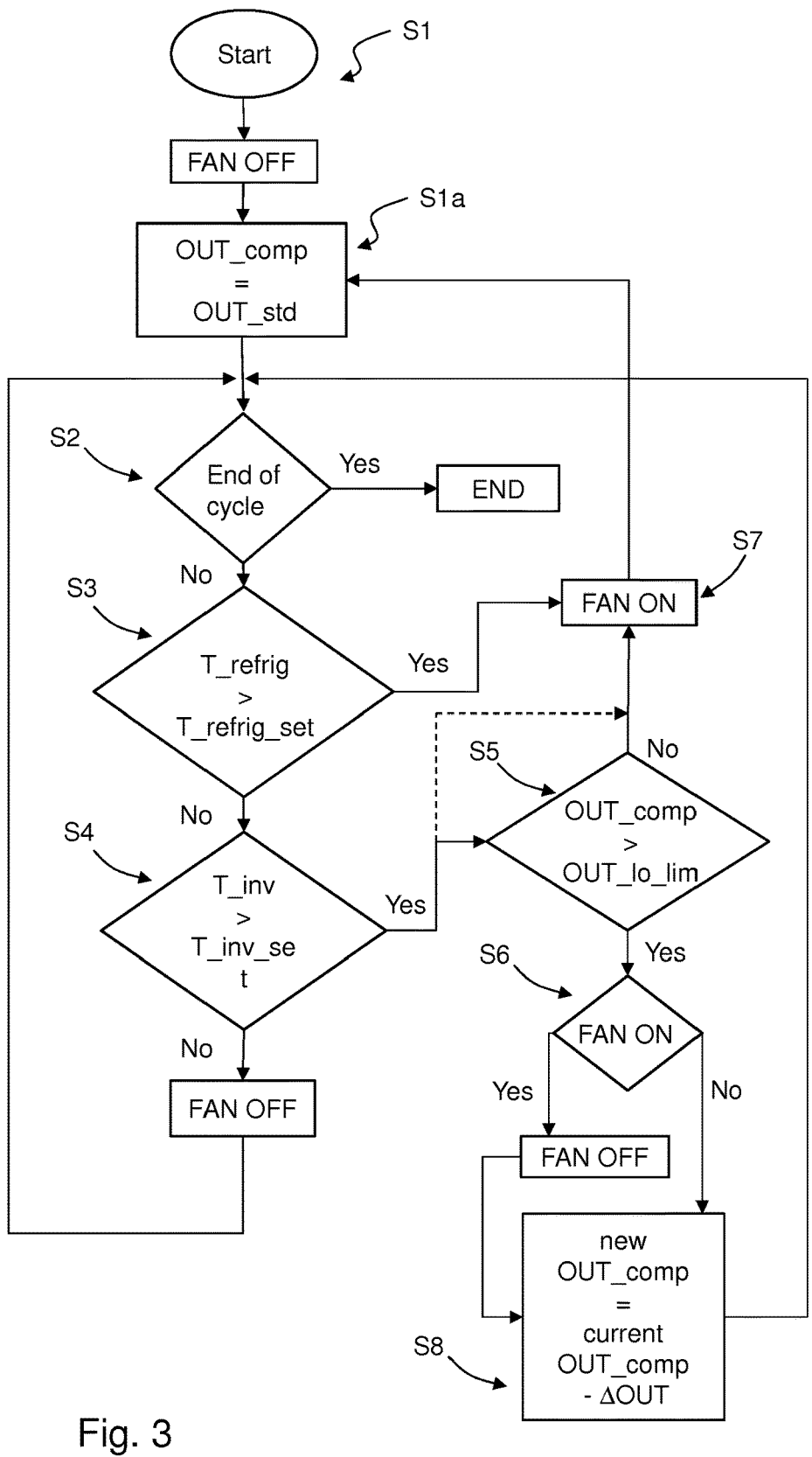

In the terms of FIG. 3, the control behavior of FIG. 4*a* corresponds to cycling through steps S2-S3-S7-S2, and the control behavior of FIG. 4*b* corresponds to cycling through steps S2-S3-S4-S7-S2 (constant speed compressor). The control behavior of FIG. 4*c* is not represented in FIG. 3.

| Reference Numeral List | |
|---|---|
| 2 | tumble dryer |
| 3 | housing/cabinet |
| 4 | heat pump system |
| 6 | refrigerant loop |
| 8 | blower |
| 10 | first heat exchanger |
| 12 | second heat exchanger |
| 14 | compressor |
| 16 | expansion device |
| 18 | drum |
| 19 | laundry |
| 20 | process air channel |
| 20a | battery channel |
| 20b | rear channel |
| 20c | rising channel |
| 20d | front channel |
| 22 | filter element |
| 30 | condensate collector |
| 36 | drain pump |
| 40 | condensate container |
| 41 | temperature sensor |
| 46 | drain pipe |
| 50 | drawer pipe |
| 51 | control unit |
| 52 | inverter board |
| 53 | cooling fan unit |
| 54 | blower |
| 56 | motor |
| 59 | compressor motor |
| 60 | board temperature sensor |
| A | process air flow |
| B | refrigerant flow |
| C | cooling air flow |
| FAN OFF | status of cooling fan unit |
| FAN ON | status of cooling fan unit |
| PWR | compressor power consumption |
| OUT_comp | compressor operation output |
| RPM_comp | compressor operation speed |
| OUT_std | standard output value |
| RPM_std | standard speed value |
| OUT_lo_lim | lower limit output value |
| ΔOUT | output reduction increment |
| S1-S7 | control steps |
| T_refrig | refrigerant temperature |
| T_refrig_set | setpoint refrigerant temperature |
| T_inv | inverter temperature |
| T_inv_set | setpoint inverter temperature |

The invention claimed is:

1. A method of operating a heat pump laundry treatment apparatus, wherein the laundry treatment apparatus includes:

a control unit controlling an operation of the laundry treatment apparatus,
a laundry treatment chamber for treating laundry using process air,
a process air circuit for circulating the process air,
a heat pump system having a refrigerant loop in which refrigerant fluid is circulated through a first and a second heat exchanger,
a compressor for circulating the refrigerant fluid through the refrigerant loop,
a cooling fan unit for cooling the compressor, wherein during the operation a conveyance capacity of the cooling fan unit is varied, and
a detector unit for detecting an operation parameter indicating a state of at least one electronic board of the apparatus,
the method comprising:
operating the cooling fan unit based upon the electronic board operation parameter, and
controlling a compressor operation output based upon the electronic board operation parameter, wherein:
controlling the operation of the cooling fan unit includes adapting the conveyance capacity of the cooling fan unit based upon the electronic board operation parameter, and
the conveyance capacity of the cooling fan unit is defined by one or more of a duty cycle ratio of switching the cooling fan unit ON and OFF, and a conveyance rate of the cooling fan unit.

2. The method according to claim 1, wherein the electronic board operation parameter is indicative of least one of:
an electronic board temperature,
a motor temperature detected via the electronic board, and
a current, delivered by the electronic board to a motor, exceeding one of a threshold value or a threshold averaged value.

3. The method according to claim 1, wherein the detector unit comprises a temperature sensor configured to detect an electronic board temperature as the electronic board operation parameter.

4. The method according to claim 1, wherein the at least one electronic board comprises a first electronic board and a second electronic board, wherein each electronic board comprises a temperature sensor configured to detect a board temperature as the electronic board temperature.

5. The method according to claim 1, wherein the conveyance rate of the cooling fan unit is modified by modifying a motor speed or fan speed of the cooling fan unit.

6. The method according to claim 1, wherein an increase of the conveyance rate of the cooling fan unit is proportional to the electronic board operation parameter exceeding a threshold value.

7. The method according to claim 1, further comprising, during the operation of the laundry treatment apparatus, additionally varying the conveyance capacity of the cooling fan unit based upon at least one of the following input variables:
a previous operation time of the laundry treatment apparatus,
a user selectable input variable,
a working parameter of a laundry drum,
a working parameter of a process air fan,
a working parameter of an electric driving motor,
a working parameter of the heat pump system,
a working parameter of the compressor,
a drying progress status parameter or a status parameter of laundry to be dried,
a power supply status of power supplied to the apparatus,
an environment parameter of an environment of the laundry treatment apparatus environment, and
a machine alarm status parameter.

8. The method according to claim 1, wherein the compressor is a variable speed compressor, the electronic board operation parameter is a temperature detected at the electronic board and the compressor output is decreased in response to an increase of the detected temperature.

9. The method according to claim 8, wherein the compressor operation output is reduced to no lower than a predefined lower output value.

10. The method according to claim 1, wherein the cooling fan unit operates based upon the electronic board operation parameter, and the compressor operation output is increased during the operation.

11. The method according to claim 10, further comprising adding an electrical energy source to increase the compressor operation output, wherein the electrical energy source compensates for heat dissipated from the compressor by the cooling fan unit when operated based upon the electronic board operation parameter.

12. The method according to claim 1, wherein a minimum conveyance capacity value of the cooling fan unit is reached during operation.

13. The method of claim 1, wherein the heat pump laundry treatment apparatus is a heat pump laundry dryer or a heat pump washing machine having a drying function.

* * * * *